United States Patent
Dewey, Jr.

[15] 3,697,889
[45] Oct. 10, 1972

[54] TUNABLE LASER

[72] Inventor: Clarence Forbes Dewey, Jr., Belmont, Mass.

[73] Assignee: Xenon Corporation, Medford, Mass.

[22] Filed: Feb. 17, 1970

[21] Appl. No.: 12,098

[52] U.S. Cl. ..................331/94.5, 350/162, 356/79, 356/99, 356/100, 356/101, 74/89.2, 74/89
[51] Int. Cl. ...........................H01s 3/08, F16h 27/02
[58] Field of Search ........331/94.5; 350/162; 356/79, 356/99, 100, 101; 74/89.2, 89

[56] References Cited

UNITED STATES PATENTS

| | | |
|---|---|---|
| 3,090,863 | 5/1963 | McPherson............356/100 X |
| 3,433,557 | 3/1969 | McPherson............356/100 X |

*Primary Examiner*—Ronald L. Wibert
*Assistant Examiner*—R. J. Webster
*Attorney*—Thomas N. Tarrant

[57] ABSTRACT

A LASER having at one end of the optical cavity a frequency selective reflector that varies the frequency of the light reflected back into the cavity by rotation. The selective reflector is supported on a first set of bearings and a tuning adjustor for rotating the reflector is supported on a separate bearing. A flexible coupling element connects the adjustor and reflector for positive rotational positioning with essentially no load coupled along other axes.

7 Claims, 3 Drawing Figures

C. Forbes Dewey, Jr.
*Inventor*
By Thomas N. Tarrant
*Attorney*

C. Forbes Dewey, Jr.
*Inventor*

TUNABLE LASER

BACKGROUND OF THE INVENTION

1. Field of the Invention

This invention relates to tunable LASERS and particularly to LASERS tunable by rotation of a diffraction grating or similar frequency selective reflector.

2. History of the Invention

The use of diffraction gratings to tune and to narrow the output spectrum of a LASER is known (see Bradley et al., IEEE J. of Quantum Electronics Vol. QE4 No. 11, Nov. 1968, pp. 707-711). The requirement of unusually high precision in the alignment and movement of parts effecting the optical cavity of a LASER provides a substantial cost barrier for these devices. An example of a sophisticated angle-adjusting mounting mechanism for an optical element is found in Rempel, U.S. Pat. No. 3,204,471.

It is neither expensive nor difficult to accurately support a single optical element for rotation around a single axis. Needle bearings are an obvious expedient. The difficulty arises in the attachment of a control to precisely adjust the angle of rotation. Any off-axis load places a high demand on needle bearings and the cost of maintaining accurate alignment rises drastically.

SUMMARY OF THE INVENTION

In accordance with the present invention a tunable LASER is provided with a frequency selective reflector at one end of the optical cavity that varies the reflected frequency by rotation. The selective reflector is mounted for rotation on first bearing supports and adjustable means for rotating the selective reflector is mounted on second bearing supports. A spring member coupling the selective reflector and the adjustable means is rigid in the direction of rotation and compliant in other directions making the selective reflector alignment independent of leading from the adjustable means. Thus it is an object of the invention to provide a novel tunable LASER.

It is a further object of the invention to provide a tunable LASER in which the tuning element is a reflector, frequency selective by rotation, mounted on bearings that maintain its rotational axis perpendicular to the optical axis and rotated by means that are mechanically decoupled from said bearings.

Further objects and features of the invention will become apparent on reading the following description together with the drawing.

DESCRIPTION OF THE PREFERRED EMBODIMENT

Figure 1:
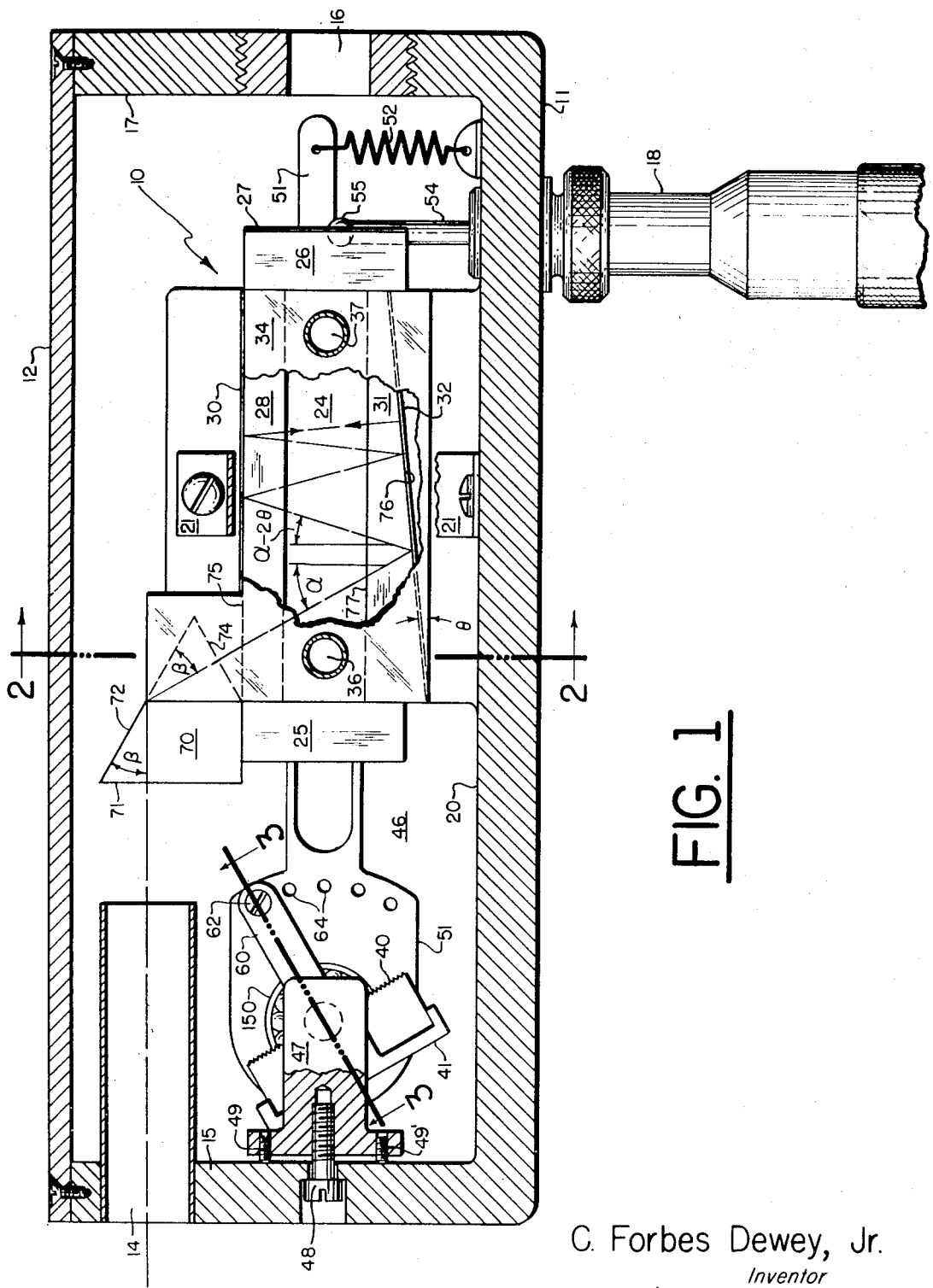
FIG. 1 is a plan view of the inventive LASER partially in section.

In a preferred embodiment, the inventive LASER cell as depicted in FIG. 1 is mounted as a tunable dye LASER. LASER cell 10 is mounted in housing 11 of rectangular cross-section. The housing material is not critical and can be made of metal or plastic designed to provide structural strength and dimensional stability. Housing 11 has a cover plate 12 suitably attached with screws to permit access. Housing 11 also has first aperture 14 in first end wall 15 of housing 11 for the entrance of pumping light and second aperture 16 in second end wall 17 of housing 11 for the LASER output beam. Micrometer-type fine tuning control 18 is mounted through sidewall 20 of housing 11.

LASER cell 10 is depicted as secured to wall 20 of housing 11 by mounting bracket 21. While the inventive concepts are applicable to solid and gas LASERS, they have been found to be of particular value in liquid dye LASERS. Gas Lasers are more commonly pumped with energy other than light. Solid LASERS cannot be varied in their light absorptive characteristics so that variations in energy coupling to exposed units of active medium are not a problem. Thus LASER cell 10 is depicted as a liquid LASER cell having a central longitudinal cavity 24 bounded by six pieces of fused silica. Fused silica is hereinafter referred to as quartz and is preferred because of its high and uniform transparency over the visible spectrum as well as its dimensional stability. End piece 25 at a first end of cavity 24 is transparent. End piece 26 at the opposite end of cavity 24 faces output aperture 16. End piece 26 has reflective coating 27 on its outer surface. Reflective coating 27 is partially transmissive and has 40 to 90 percent reflectivity for liquid dye LASERS. For the particular dye solutions tested, a reflectivity near 40% has produced good lasing action.

Figure 2:
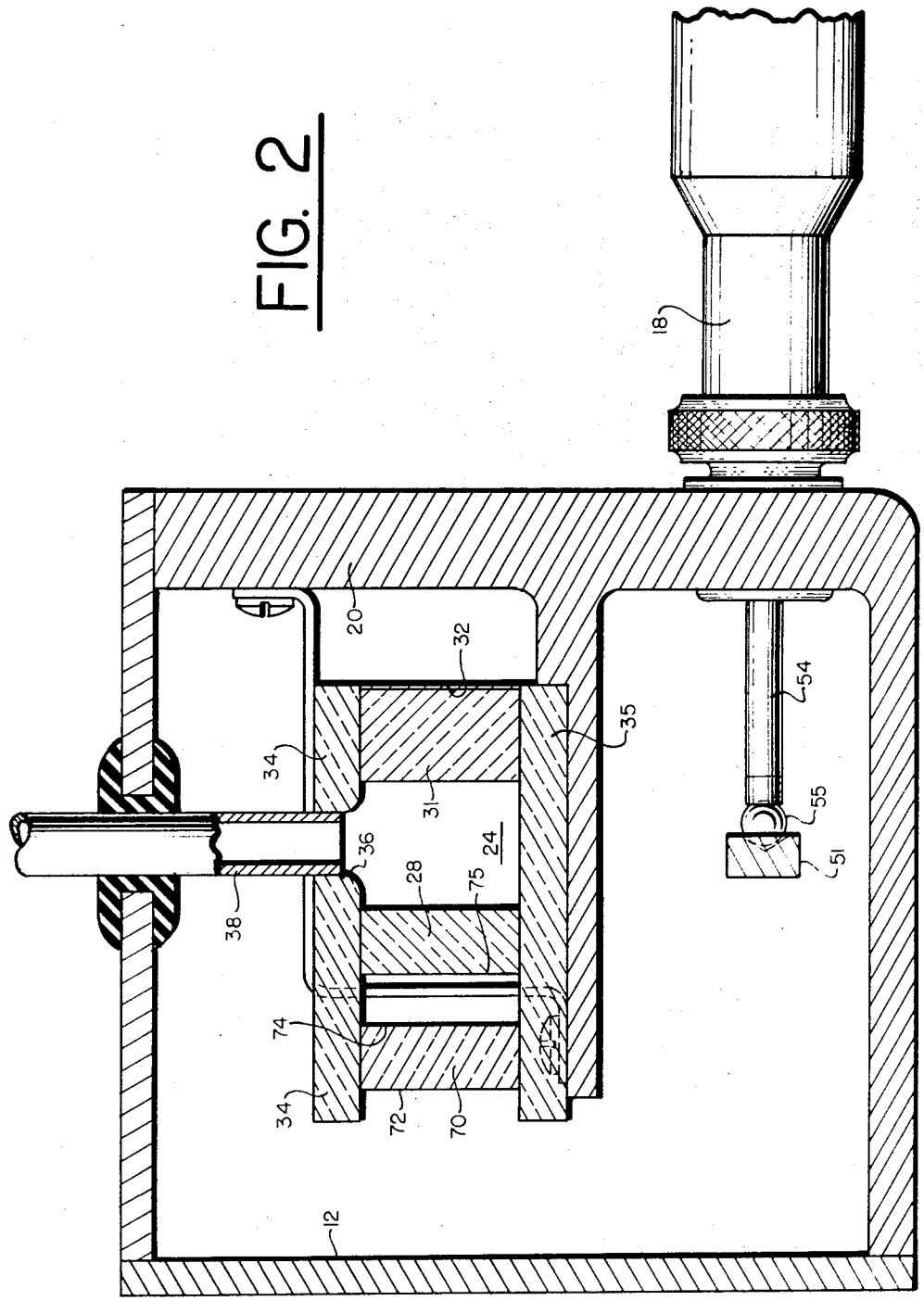
FIG. 2 is a sectional view through section 2—2 of FIG. 1.

The sides of cavity 24 are bounded by flat piece 28 having reflective coating 30 ≥ 99 percent reflectivity and tapered piece 31 having reflective coating 32 ≥ 99 percent reflectivity. The reflective coatings have all been used on the exterior surfaces to avoid deleterious effects from contact with the dye solutions. Top piece 34 and bottom piece 35 are flat transparent pieces illustrated in FIG. 2. Transparency of pieces 34 and 35 is for visual access and is not essential to operation of the dye LASER. It has been found expedient to grind the outer surfaces of pieces 34 and 35 to avoid forming a LASER cavity mode perpendicular to the desired cavity axis. Top piece 34 has two apertures 36 and 37 to which are connected tubes 38 for adding and draining dye solution. The two tubes permit continuous circulation for dye solutions that become nonresponsive with repeated pumping.

Figure 3:
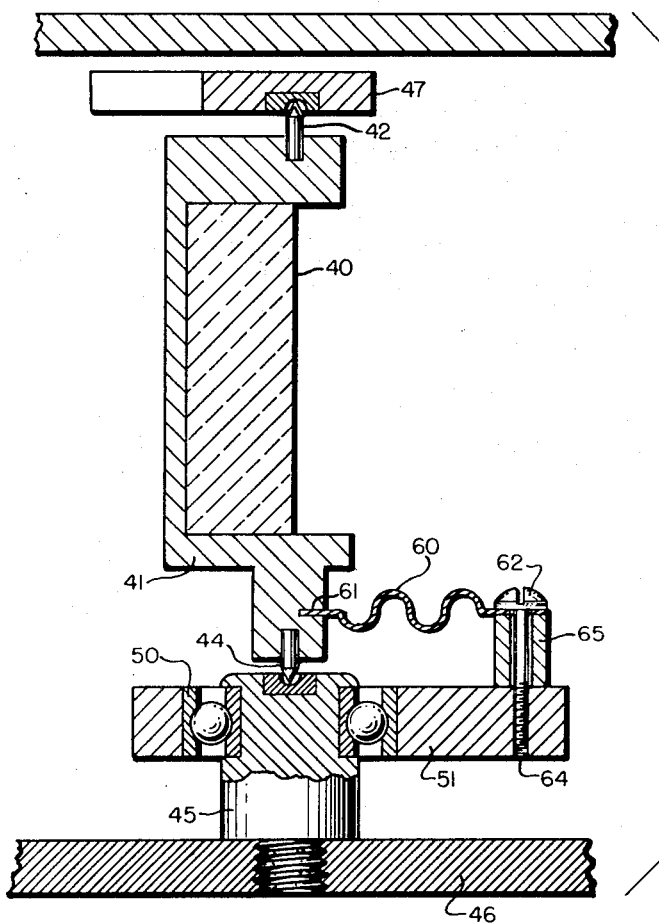
FIG. 3 is a sectional view through section 3—3 of FIG. 1.

The optical cavity of the LASER is bounded by reflective coating 27 at the output end and by diffraction grating 40 facing end piece 25 at the other end. Diffraction grating 40 is mounted in bracket 41 which in turn is supported by top and bottom needle bearings 42 and 44 depicted in FIG. 3. Needle bearing 44 bears against stud 45 secured in bottom wall 46 of housing 11. Needle bearing 42 bears against support 47 which is secured to end wall 15 of housing 11 by machine screw 48 (FIG. 1). Two set screws 49 and 49' provide locating adjustment of needle bearing 42 for accurate vertical alignment.

Ball bearing race 50 pressure fitted on stud 45 supports tuning arm 51 for rotating grating 40. Tuning arm 51 extends below LASER cell 10 for substantially the interior length of housing 11. Near end wall 17, tuning arm 51 is tensioned toward side wall 20 by spring 52. Near spring 52, movable pin 54 of fine tuning control 18 bears against arm 51 by means of ball bearing 55. Ball bearing 55 rides in a spherical recess (not shown) at the end of pin 54 and a V-groove (see FIG. 2) in arm 51 to minimize friction. Spring 52 holds arm 51 firmly in contact with bearing 55 and pin 54.

Thus the bearing supports of grating 40 and tuning arm 51 are independent and additional coupling means is required between the two. Since the independent bearing supports avoid loading of the grating assembly by the tuning mechanism, the coupling means must give positive rotational control of grating 40 with the least possible vertical coupling that would add load on needle bearings 42 and 44. Accordingly, the coupling is provided by flat spring member 60 having accordion folds to give maximum flexibility in longitudinal and vertical directions. Spring member 60 is relatively wide in the horizontal dimension to provide rigid rotational coupling between arm 51 and grating 40.

Spring member 60 is suitably secured at one end to grating 40 by cementing of clamping in slot 61 of mounting bracket 41. The other end is conveniently secured to arm 51 by machine screw 62 which may be screwed into any one of a plurality of threaded holes 64 so as to provide a coarse tuning adjustment. Bushing 65 around screw 62 between arm 51 and member 60 keeps member 60 substantially parallel with arm 51.

In order to receive pump light along an axis parallel with cavity 24 and direct it transversely into cavity 24, prism 70 is mounted adjacent to side piece 28 positioned to receive light entering through aperture 14. As depicted, face 71 of prism 70 is normal to properly aligned incoming light. The "roof" 72 of prism 70 is slanted toward cavity 24 so as to form an angle "$\beta$" with the incident light. Exit surface 74 of prism 70 faces "window" 75 in side piece 28. Window 75 is an aperture in reflective coating 30. Preferably this aperture as well as surfaces 71 and 74 of prism 70 have antireflection coatings to permit maximum light transmission. The surfaces 76 and 77 of sidepiece 31 are not parallel. In the embodiment depicted the inside surface 77 is parallel with the axis of cavity 24 while outside surface 76 forms an angle $\theta$ with respect to a parallel of the axis of cavity 24.

The angles $\beta$ and $\theta$ are selected so that light entering prism 70 at face 71 will "walk" by multiple reflections down cavity 24 toward end piece 26 and back. In selecting these angles it is preferable that the light in its path of multiple reflections should not reach end piece 26 but it should have more than two reflections before reversing direction so as to distribute the energy through a substantial portion of the cell medium.

Prism 70 can be replaced by a mirror positioned as prism roof 72.

In operation, cavity 24 is filled with a liquid sensitized by suitable dyes for lasing action. Pumping light is supplied from an external source, for example a ruby or neodymium LASER. The pump light is reflected from prism roof 72 at an angle $\beta$ and passes through cavity 24 at an angle $\alpha$ relative to a normal with the axis of cavity 24. The light is reflected by coating 32 of side piece 31 and passes back through cavity 24 at an angle $\alpha - 2\theta$ with a normal from the cavity axis. With each reflection from coating 32 these angles become smaller until they go negative and the direction of the light travel reverses. The lasing frequency is coarse and fine tuned by rotating grating 40 using holes 64 and micrometer adjustment 18 respectively.

EXAMPLE

LASER cell 10 was made of six pieces of quartz bonded together by epoxy resin. Mirror coating 27 was made 40 percent reflective. Diffraction grating 40 was an aluminum coated replica grating of 600 lines/mm blazed for a first order at 1 micron.

Cavity 24 was filled with DTTC (3,3'-diethylthiatricarbocyanine iodide) dye in dimethyl sulfoxide with a concentration passing 10 percent of incoming 6,943 A light in a path length of 2.5 inches. The optical cavity (between grating 40 and reflective coating 27) was 5 inches long. Cavity 24 was 2.5 inches long.

Angle $\beta$ was 30°
Angle $\theta$ was 5°

Pumping with a Q-switched ruby LASER with an output power of about 0.1 Joules in about 20 nanoseconds, intense tunable LASER light was produced in the range of 8,200 A to 8,300 A with an output wavelength bandwidth of approximately 10 A.

While the invention has been described with respect to specific embodiments of a liquid dye LASER, it is readily applicable to many other types of LASERS. Many variations are also possible in the optical cavity without effecting the inventive concepts. For example, the diffraction grating described can be replaced with an echelle grating to reduce the width of the output spectrum to $\approx 1$ A as described by Bradley et al. in the IEEE article referred to previously. U.S. Pat. No. 3,443,243 to Patel suggests still a further applicable arrangement in which a diffraction grating is used outside the primary optical cavity. Thus it is intended to cover the invention broadly within the spirit and scope of the appended claims.

I claim:

1. A tunable LASER comprising:
    a. An optical cavity having an optical axis and terminated at one end with a partially reflective mirror;
    b. a reflector, frequency selective by rotation, for terminating the other end of said cavity;
    c. first bearing means for mounting said reflector with its axis of rotation in line with and perpendicular to said optical axis;
    d. adjustable means for rotating said reflector;
    e. second bearing means for mounting said adjustable means; and,
    f. compliant coupling means coupling said reflector and said adjustable means rigidly with respect to rotation of said reflector and compliantly with respect to other directions whereby said adjustable means is effectively decoupled from loading said first bearing means.

2. A tunable LASER according to claim 1 wherein said reflector is a diffraction grating and said first bearing means is first and second needle bearings.

3. A tunable LASER according to claim 2 wherein said tunable LASER further comprises a support housing, a bearing mounting stud in said support housing a bearing surface for said first needle bearing fixed to said mounting stud, and a bearing surface for said second bearing means fixed to said mounting stud.

4. A tunable LASER according to claim 2 wherein said second bearing means comprises a ball bearing race.

5. A tunable LASER according to claim 1 wherein said adjustable means is an arm, said second bearing means is a race of ball bearings supporting said arm, and said LASER further comprises a micrometer bearing against said arm for moving said arm radially about said second bearing means.

6. A tunable LASER according to claim 5 wherein said LASER further comprises a dye LASER cell carrying said partially reflective mirror and said arm traverses the length of said cell with said micrometer bearing against said arm substantially at said one end.

7. A tunable LASER according to claim 5 further comprising elastic means biasing said arm against said micrometer and a ball bearing positioned between said micrometer and said arm held in position by recesses in said micrometer and said arm whereby friction between said arm and said micrometer during adjustment is reduced.

* * * * *